United States Patent

[11] 3,611,186

[72] Inventor Wilhelmus Jacobus Witteman
Emmasingel, Eindhoven, Netherlands
[21] Appl. No. 817,681
[22] Filed Apr. 21, 1969
[45] Patented Oct. 5, 1971
[73] Assignee U.S. Philips Corporation
New York, N.Y.
[32] Priority Apr. 25, 1968
[33] Netherlands
[31] 6805921

[54] LASER INCLUDING A TUBE INTERCONNECTING THE ENDS OF THE DISCHARGE TUBE
4 Claims, 1 Drawing Fig.
[52] U.S. Cl. .................................................. 331/94.5, 313/223
[51] Int. Cl. .................................................. H01s 3/00
[50] Field of Search .......................................... 331/94.5

[56] References Cited
UNITED STATES PATENTS
3,435,373  3/1969  Wolff .......................... 331/94.5
OTHER REFERENCES
"Effect of a Heated Platinum Wire on a Sealed CO 2 Laser System" by F. M. Taylor and A. Lombarde, Applied Physics Letters, Vol. 11, No. 6, Sept. 15, 1967, pp. 180-182. 331-94.5
"High-Output Powers and Long Lifetimes of Sealed-Off CO 2 Lasers" by W. J. Witteman, Applied Physics Letters, Vol. 11, No. 11, Dec. 1, 1967, pp. 337, 338. 331-94.5

Primary Examiner—Raymond F. Hossfeld
Attorney—Frank R. Trifari

ABSTRACT: An infrared emission production device having a mixture of carbonic acid gas, nitrogen, helium and water vapor in a closed discharge tube, the ends of the discharge tube connected by a connection tube extending parallel to the discharge tube, the diameter of the connection tube being at most one-third the diameter of the discharge tube.

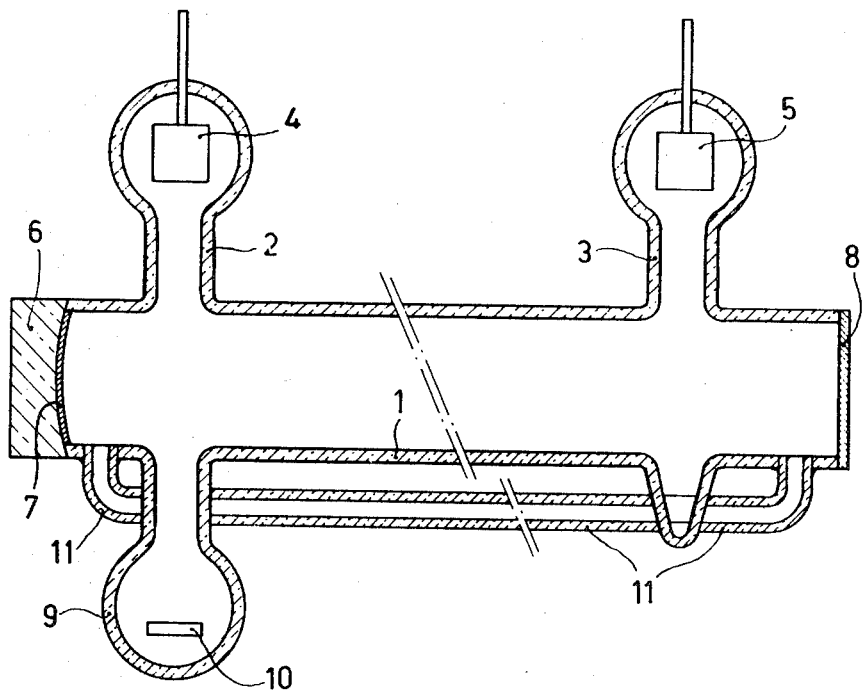
INVENTOR.
WILHELMUS J. WITTEMAN
BY
AGENT

LASER INCLUDING A TUBE INTERCONNECTING THE ENDS OF THE DISCHARGE TUBE

The invention relates to a device for producing stimulated infrared emission, an iraser, by means of an electric discharge in a gas mixture consisting of carbonic acid gas, nitrogen, helium and water vapor in a discharge tube of a few meters length. The invention furthermore relates to an electric discharge tube, destined for such a device.

A length of a few meters is to be understood to mean herein more than approximately 1½ meters.

In a discharge tube, of the type described, hydrogen may initially be present instead of water vapor since the oxygen which is always present will form water vapor with the hydrogen.

The presence of water vapor is required in connection with the continuous regeneration of the dissociating carbonic acid gas.

In order to maintain the water pressure at the desired level, it has already been proposed in a prior patent application to provide a quantity of a substance in contact with the gas filling, which substance is wholly or partially saturated with water vapor, for example, zeolite.

It has been found, however, that also in the presence of such a water vapor replenisher, the irradiated power of the iraser begins to decrease after several hundreds of hours.

It is the object of the invention to improve this.

According to the invention, a device for producing stimulated infrared emission, otherwise an iraser, is described wherein an electric discharge is provided in a gas mixture. The mixture consists of carbonic acid gas, nitrogen, helium and water vapor in a discharge tube of a few meters length, the ends of the discharge tube connected by a connection tube extending substantially parallel to the discharge tube. The diameter of the said connection tube is at most one-third of the diameter of the discharge tube.

The connection tube is provided with a small diameter so that no discharge can occur. The discharge tube operates so as to prevent that cataphoretic unmixing which occurs in the discharge tube from resulting in the water vapor not being capable of performing its regeneration function. Actually it has been found that in tubes the irradiated power of which begins to decrease a strong cataphoretic unmixing occurs.

Increasing the water vapor pressure is not possible, because this causes the power to be reduced.

The invention may be applied to tubes without or with water vapor replenisher. In the latter case it has been found that this must be situated on the anode side of the discharge tube.

It is to be noted that in so-called argon ion lasers a connection tube is provided between the anode and cathode space in order to settle the pressure differential which is formed under the influence of the discharge. These argon ion lasers, however, are short, approximately 25 cm., and for a good pressure settlement a wide connection tube must be chosen which, however, in connection with the restriction of the discharge to the actual discharge space, must be proportionally longer. This connection tube is therefore helical. Moreover an ignition device must be provided on the actual discharge tube. This latter is not necessary in the device according to the invention. Moreover, the narrow connection tube in the device according to the invention would be insufficient for setting the resulting pressure differential. However, for counteracting the unmixing by diffusion, the narrow tube is sufficient.

In order that the invention may be readily carried into effect, one example thereof will now be described in greater detail, by way of example, with reference to the accompanying drawing, the sole FIGURE of which is a diagrammatic cross-sectional view of a discharge tube for a device according to the invention.

Reference numeral 1 in the FIGURE denotes a quartz tube, length well over 1½ meters, inside diameter 20 mm. Inside tubes 2 and 3, platinum cylinders 4 and 5 are arranged and serve as the anode and cathode, respectively, of the discharge. On the left-hand side the tube 1 is sealed in a vacuumtight manner by means of the concave ground quartz block 6, radius of curvature 2.5 m. This block is coated with a layer of gold 7. On the right-hand side the tube is closed by a flat germanium plate 8, 2 mm. thickness. In the side tube 9, a rod of zeolite 10 is arranged, length 5 mm, diameter 2 mm. The ends of the tube 1 communicate with each other through a quartz tube 11, inside diameter 6 mm.

The gas filling of the tube consists of 2 torr $CO_2$, 2.5 torr $N_2$ and 11 torr He, the water vapor pressure above the zeolite rod 10 being 0.2 mm. The rod is saturated with water vapor and contains approximately 100 times the quantity of water which is present in a vapor form. At an operating voltage of approximately 14 kv. a current of 40 ma. flows through the tube, a coherent beam having a wavelength of 10.6 $\mu$ and an intensity of 60 watt emerging from the window 8. After 1,000 hours in operation, reduction in intensity does not yet occur.

What is claimed is:

1. A device for producing stimulated infrared emission with a construction for maintaining water vapor comprising an enclosed discharge tube containing a gas mixture of carbonic acid gas, nitrogen, helium and water vapor and means including an anode electrode and a cathode electrode for providing an electric discharge in said mixture, the ends of said discharge tube interconnected by a connection tube for maintaining the water vapor, fully enclosed except for openings at the ends thereof adjacent the said discharge tube ends, said connection tube extending substantially parallel to said discharge tube and allowing the diffusion therethrough of components of water vapor present at the said discharge tube ends, the diameter of said connection tube not exceeding one-third the diameter of said discharge tube.

2. The combination of claim 1 wherein said mixture consists 2 torr $CO_2$, 2.5 torr. $N_2$, 11 torr He and 0.2 torr $H_2O$.

3. The combination of claim 1 wherein said discharge tube includes a side tube out of the discharge path, said side tube containing a water vapor replenisher adjacent said anode electrode.

4. The combination of claim 3 wherein said water vapor replenisher is a water vapor saturated zeolitile rod.